S. B. WELTON.
Axle-Box.
No. 68,017
Patented Aug. 20, 1867.
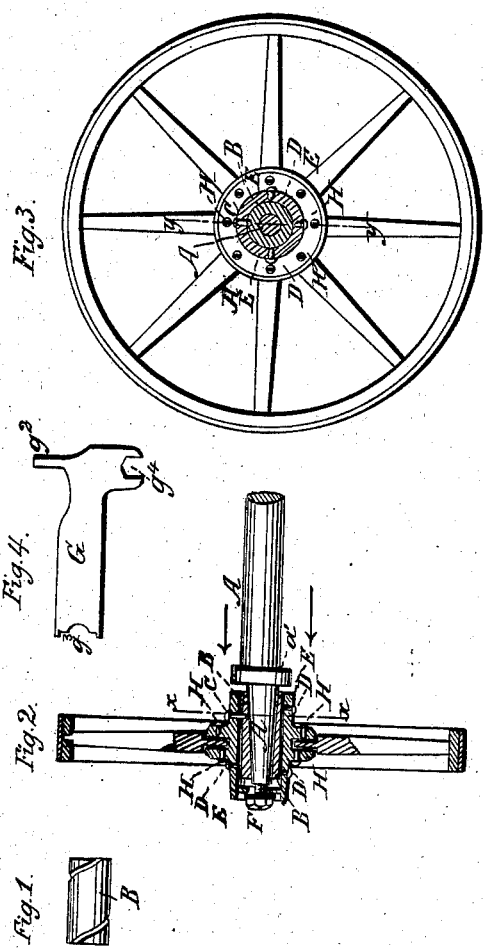
Witnesses.
Thos. Tusches
J. A. Service.
Inventor:
S. B. Welton.
Per Munn & Co.
Attys.

United States Patent Office

S. B. WELTON, OF WATERBURY, CONNECTICUT.

Letters Patent No. 68,017, dated August 20, 1867.

---

IMPROVEMENT IN WAGON-WHEEL.

---

*The Schedule referred to in these Letters Patent and making part of the same.*

---

TO ALL WHOM IT MAY CONCERN:

Be it known that I, S. B. WELTON, of Waterbury, in the county of New Haven, and State of Connecticut, have invented a new and useful Improvement in Wheels for Wagons and other vehicles; and I do hereby declare that the following is a full, clear, and exact description thereof, which will enable others skilled in the art to make and use the same, reference being had to the accompanying drawings, forming part of this specification, in which—

Figure 1 is a side view of my improved axle-box.

Figure 2 is a longitudinal section of the axle-box and hub, showing the axle in place, taken through the line $y\,y$, fig. 3.

Figure 3 is a cross-section of the same, taken through the line $x\,x$, fig. 2.

Figure 4 is a side view of the wrench.

Similar letters of reference indicate like parts.

My invention has for its object to so improve the construction of the axle-box and hub that the box may be easily removed and replaced, and that it may be readily adjusted to compensate for the wear; and it consists in the construction of the axle-box, in the manner in which it is secured in the hub, and in the manner in which the spokes are secured in the hub.

A is the axle, the bearing of which is made tapering in the ordinary manner. B is the axle-box, which fits upon the tapering bearing of the axle, but is not large enough to slip back to the flange $a'$. The outer surface of the box B is grooved spirally, as shown in fig. 1. C is a set-screw, which passes in through the side of the hub, and enters the groove in the outer surface of the box B, and guides it to its place. D are set-screws passing in through the sides of the hub E and pressing against the surface of the box B, to hold it securely in place in the hub. F is the nut by which the hub is secured in place upon the axle A. G is the wrench, the part $g^1$ of which is so formed as to take hold of the nut F; the part $g^2$ is so formed as to be used as a screw-driver, to operate the set-screws C and D; and the front $g^3$ is formed with two prongs, to enter the holes in the inner end of the box B, to turn it out or in, as required. The hub E is formed with a flange around its central part, in which are formed the mortises for the reception of the tenons of the spokes, where they are secured in place by the set-screws H, which pass through the flange and enter the tenon of the spoke a quarter or a half of an inch, the screw upon the inner side of the hub passing through the flange near its outer edge, and the other one passing through it near the body of the hub.

By this construction and arrangement of the axle-box it is made to wear much longer than it otherwise would, for, as the box becomes worn the screws C and D are loosened, and the box turned out a little with the wrench G, so as to again fit the axle A. And this operation may be repeated until the box has been turned out so far as to reach the flange or shoulder $a'$, by which time it will be completely worn out, and can then be replaced with a new one. By setting the screws H, which are upon the inner side of the flange of the hub, near its outer edge, and those upon its outside near the body of said hub, they more effectively resist the tendency of the spokes to break towards the inner side of the hub, or towards the body of the wagon.

Having thus described my invention, what I claim as new, and desire to secure by Letters Patent, is—

The axle-box B, formed with a spiral groove upon its outer side, and adjustably secured in place in the hub E by the set-screws C and D, substantially as herein shown and described, and for the purposes set forth.

S. B. WELTON.

Witnesses:
L. SANFORD DAVIES,
PETER W. POWELL.